Feb. 7, 1933.　　　　C. H. VOGT　　　　1,896,210
FILLING AND MEASURING MACHINE
Filed Jan. 30, 1928　　　4 Sheets-Sheet 1

Inventor
Charles H. Vogt
William A. Strauch
Attorney

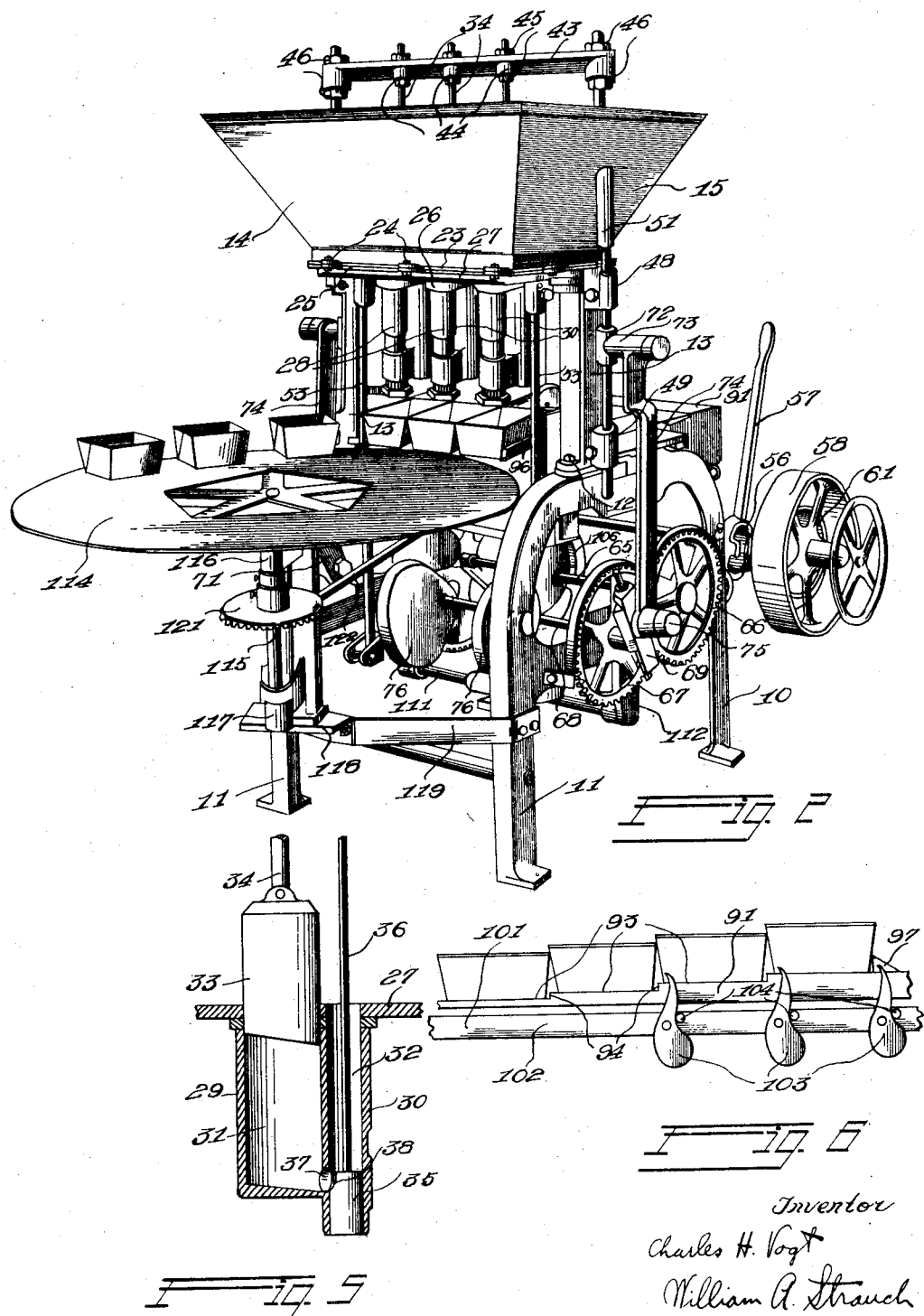

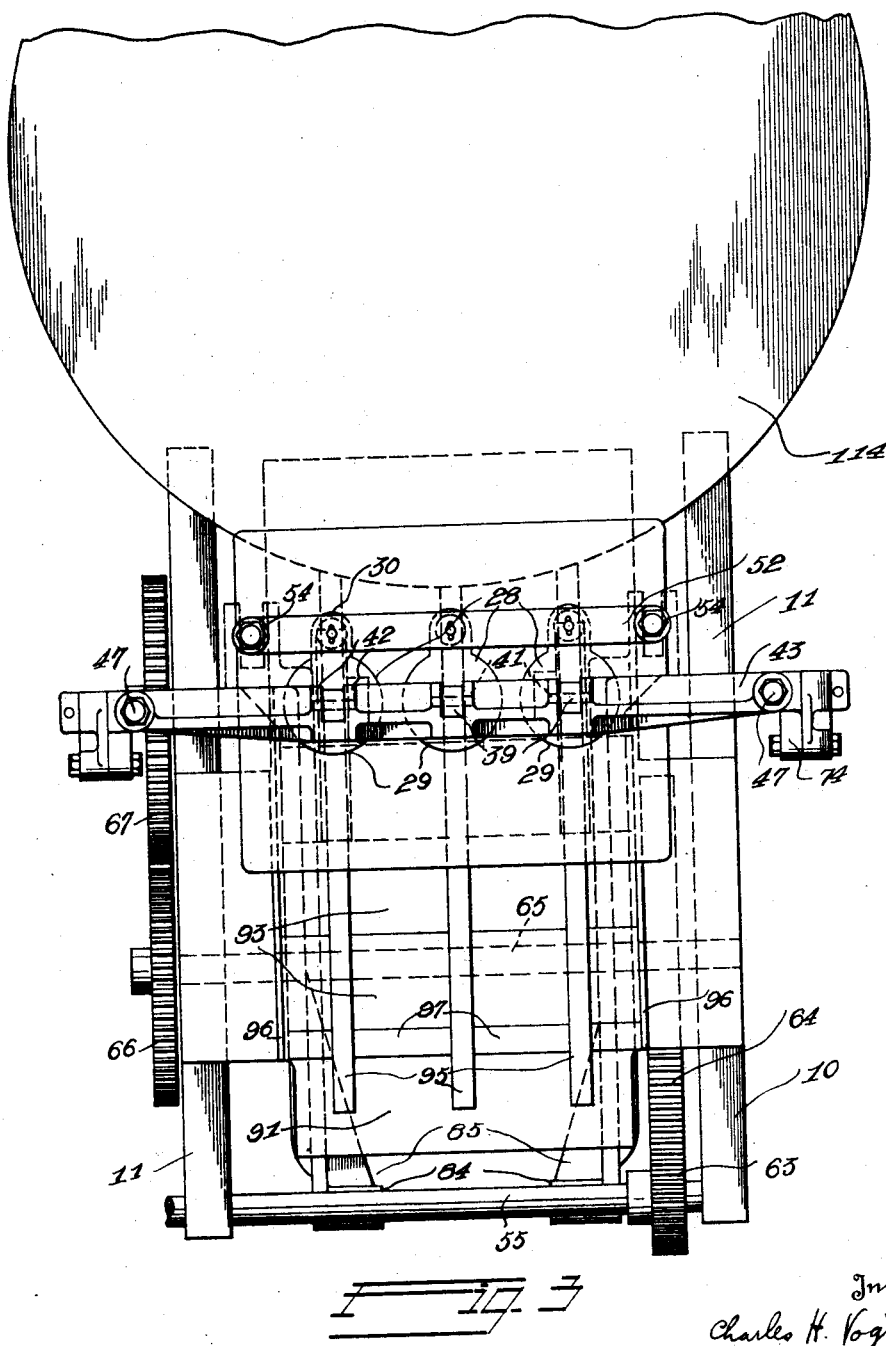

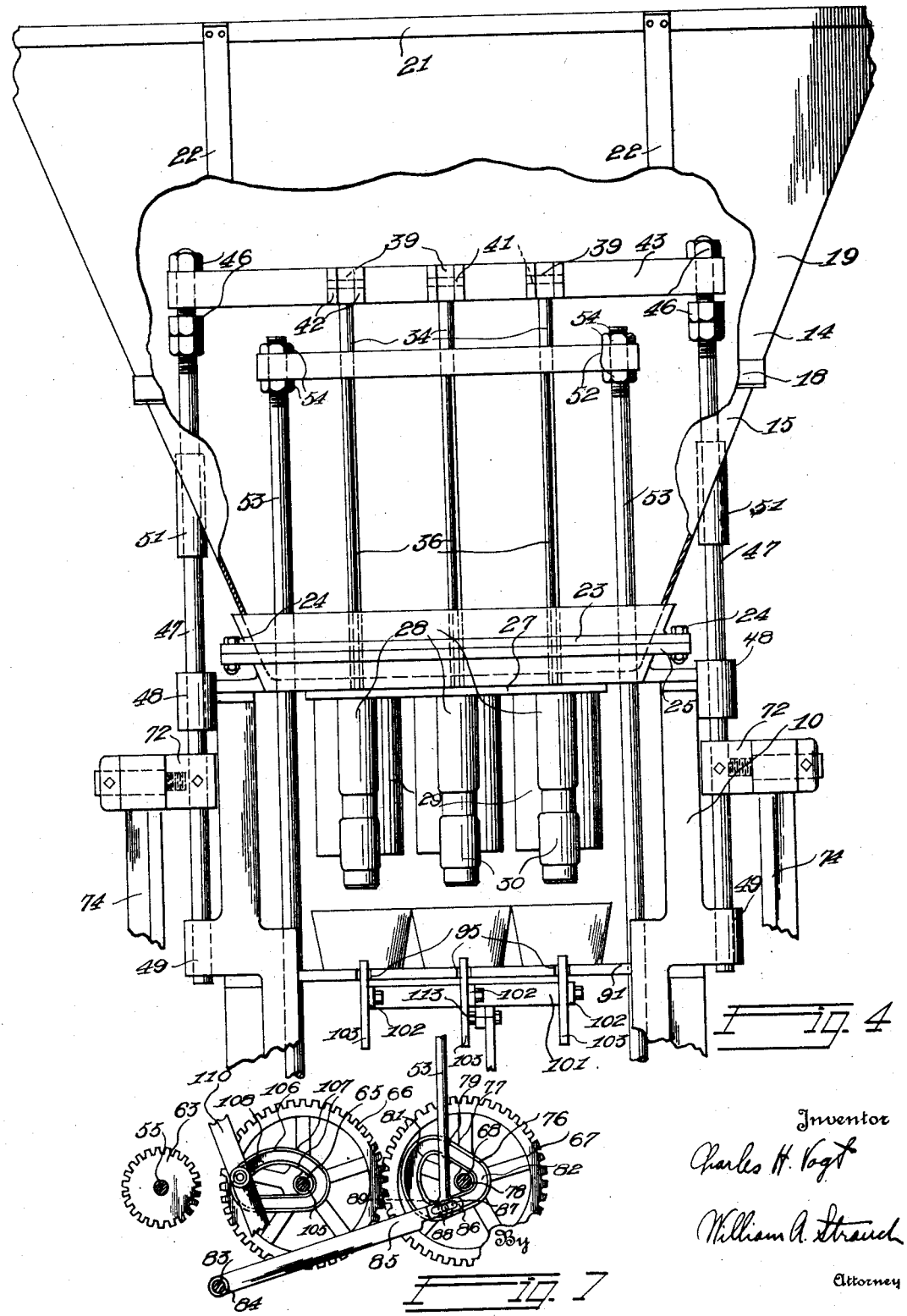

Patented Feb. 7, 1933

1,896,210

UNITED STATES PATENT OFFICE

CHARLES H. VOGT, OF PHILADELPHIA, PENNSYLVANIA

FILLING AND MEASURING MACHINE

Application filed January 30, 1928. Serial No. 250,472.

This invention relates to a novel form of filling machine and relates particularly to machines especially adapted for filling measured and uniform quantities of material automatically into pans.

A preliminary object of the invention is to provide novel filling and measuring mechanisms adapted to fill hot scrapple and similar mixtures into pans accurately, efficiently and economically.

Another object of the invention is the provision of a pan filling machine comprising means for successively advancing pans to a filling position, discharging measured quantities of materials into the pans while in filling position, and for automatically moving the filled pans away from the discharging means.

A further object of the invention is the provision of a filling machine especially adapted for filling scrapple comprising pan advancing means, pan discharging means, and intermediately disposed pan filling means, all of said means being positively actuated in such timed relation that the filling operation is carried out un-interruptedly, filling a uniform measured quantity of scrapple in each pan.

With these objects in view as well as others that will become apparent from the following disclosure and the terms of the appended claims reference will be had to the accompanying drawings forming a part thereof and in which:—

Figure 2 is a perspective view of the machine shown in Figure 1 as seen from the discharge side thereof with the upper hopper section removed.

Figure 3 is a top plan view of the machine, slightly modified as will hereinafter be explained, with a portion of the revolving table broken away and the feed platform omitted.

Figure 4 is a rear elevational view, likewise slightly modified, with portions thereof broken away.

Figure 5 is a longitudinal sectional view through one of the measuring shells.

Figure 6 is a longitudinal sectional view through the pan feeding mechanism with those pans directly over the visible pawls removed, and Figure 7 is a side view more or less diagrammatic in nature showing the valve rod and pusher operating cams.

Figure 1:
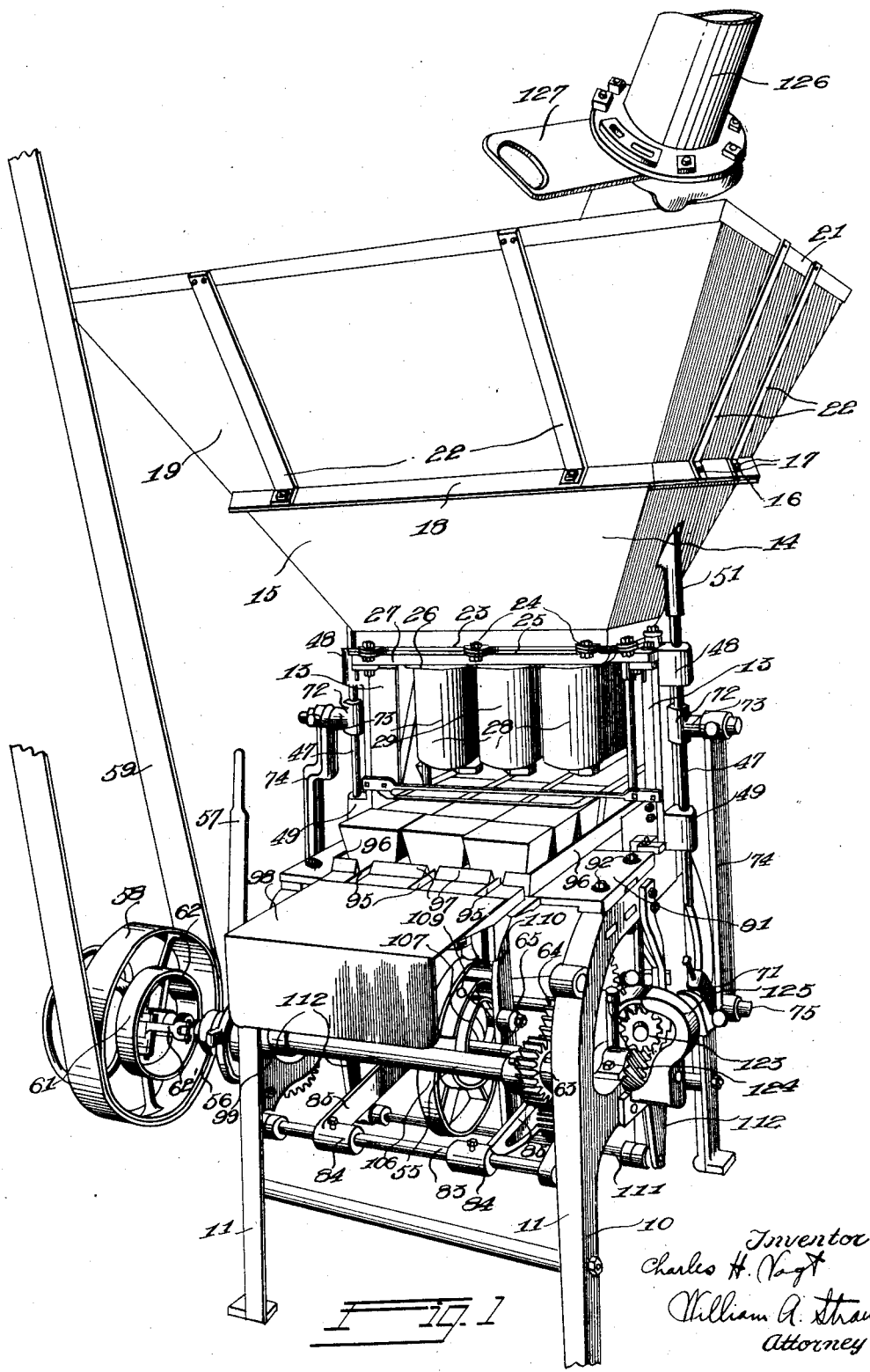
Figure 1 is a perspective view of a preferred form of filling machine embodying my invention as seen from the feed side thereof.

Referring to the drawings by reference characters, in which like characters designate like parts, 10 designates a frame structure comprising a pair of laterally spaced side members 11 each of which has detachably secured thereto as at 12 (Figure 2) a vertically extending hopper support 13. Detachably supported by the upper ends of the supports 13 is an outwardly tapered hopper 14 which comprises a lower section 15 (Figure 1) provided with flanges 16 at the opposite sides thereof to which is detachably secured by means of bolts 17, the continuous marginal flange 18 carried by an upper section 19. Upper section 19 is provided with an upper marginal flange 21, and the flanges 18 and 21 are connected by braces 22.

The lower end of the lower section 15 of the hopper 14 is provided with an outwardly extending marginal flange 23 which is detachably secured by means of bolts 24 to an outwardly extending marginal flange 25 carried by a feeding member 26 supported from side posts 13.

The feeding member 26 comprises a plate 27 from which project a plurality of measuring shells 28. Each of the measuring shells 28 comprises a pair of integrally connected cylinders 29 and 30 (Figure 5) providing a relatively large chamber 31 and a relatively small chamber 32 respectively, the chamber 32 extending a short distance below the chamber 31 as is clearly shown in Figure 5.

Disposed within each chamber 31 and mounted for reciprocation therein is a plunger 33 which is supported by a vertically extending rod 34, and disposed within each chamber 32 for reciprocation therein is a plunger 35 which is supported by a vertically extending rod 36. Chambers 31 and 32 are in communication by a port 37 adjacent the bottom of chamber 31, and the plunger 35 is provided with an arcuately cut away portion 38 adjacent the upper end thereof.

Rods 34 supporting plungers 33 are preferably provided at the upper ends thereof with enlarged heads 39 (Figure 4) which are pivotally secured by means of pins 41 between pairs of lugs 42 carried by a transversely disposed reciprocable bar 43.

However, as is shown in Figure 2 the upper ends of the rods 34 instead of being pivoted to the bar 43 may be terminally threaded and extended through bosses 44 on the bar 43 and locked in position by nuts 45 turned up against the upper and lower ends of the bosses 44 on the threaded ends of the rods.

Extending through the opposite ends of the bar 43 and locked in position by nuts 46 are the upper threaded ends of vertical rods 47 which are guided for vertical reciprocating motion by upper and lower guides 48 and 49 respectively, carried by vertical supports 13 of frame 10, and further guided by tubular guides 51 supported by the lower hopper section 15.

Rods 36 supporting plungers 35 extend vertically upward within hopper 14 and are secured at the upper ends thereof to a transversely extending reciprocable bar 52. Extending through the opposite ends of the bar 52 are the upper threaded ends of vertically extending reciprocable rods 53 which are detachably secured to the bar 52 by means of nuts 54 turned up against opposite sides of bar 52 on the threaded ends of rods 53. Rods 53 extend downwardly from bars 52 through the top of frame 10 in which they are guided for vertical reciprocating movement and are actuated by means hereinafter described.

Extending transversely of frame 10 and suitably journaled in side members 11 thereof is a drive shaft 55 which has, slidably keyed on a projecting end thereof, a clutch control cone 56 (Figure 1) and is shifted on shaft 55 by means of an actuating lever 57. Loosely mounted on the projecting end of the shaft 55 outwardly of cone 56 is a drive pulley 58 adapted to be driven by a belt 59. Carried by pulley 58 is a drum 61 in which are expansible clutch shoes 62, adapted to be expanded into frictional engagement with the drum 61 by means of the toggle arms 62' operated by cone 56, to provide a driving connection between the pulley 58 and shaft 55 in a manner obvious to those skilled in the art.

The opposite end of drive shaft 55 carries a pinion 63 which meshes with and imparts rotation to a gear wheel 64 fixed to one end of and driving the transversely extending shaft 65 which at its opposite ends is suitably journaled in the side members 11 of the frame 10.

Secured to the opposite end of shaft 65 outside the frame 10 and driven thereby is a gear wheel 66 (Figure 2) which meshes with and imparts rotation to a similar gear wheel 67 fixed to the projecting end of and driving a transversely extending shaft 68 suitably journaled in side members 11 of the frame 10. Carried by the projecting end of the shaft 68 adjacent the gear wheel 67 is a pitman or crank arm 69 and a similar pitman or crank arm 71 is carried by the opposite end of the shaft 68. Adjustably secured to each of the rods 47 at a point intermediate guides 48 and 49 is a sleeve 72 provided with a lateral projection 73. Detachably secured to projections 73 for pivotal movement with relation thereto are the upper ends of connecting rods 74 whose lower ends are eccentrically pivoted to the pitmen or cranks 69 and 71 by crank pins 75 so that upon rotation of the shaft 68 connecting rods 74 are given swinging oscillating movements which in turn impart vertical reciprocation to the rods 47 and consequently to the pistons 33 in the chambers 31.

Supported by the shaft 68 and fixed thereto in transversely spaced relation is a pair of cams 76 (Figures 2 and 7), each of which comprises a disk 77 provided with a hub portion 78 keyed or secured to shaft 68. Disks 77 are provided with marginal flanges 79 and other flanges 81 inward thereof and parallel thereto defining a roller receiving guide channel 82.

Extending transversely of frame 10 and having its opposite ends journaled in side members 11 thereof is a rotatable shaft 83 (Figures 1 and 7), to which are fixed tubular ends 84 of laterally spaced guiding bars 85 whose opposite ends are provided with bifurcated heads 86 each provided with a longitudinal slot 87 in each of the arms thereof formed by the bifurcation. The lower ends of rods 53 extend into the bifurcated heads 86 and are provided with pins 88 which are disposed in the slots 87 and which are provided with rollers 89 riding in and actuated by guide channels 82 of the cams 76 upon rotation of the shaft 68 to impart vertical reciprocating motion to the rods 53 and consequently to the control or valve pistons 35 within the chambers 32.

Means is provided for positioning the pans to be filled to receive charges of scrapple from the measuring shells 28 which comprises a pan receiving and supporting table 91 (Figures 1 and 6) secured to the tops of the side members 11 of the frame 10 as indicated at 92. Table 91 is provided with a plurality of pan supporting seats 93 arranged in stepped formation having successive shoulders 94 at the junctions of the supporting seats 93, the seats being stepped downward toward the measuring shells 28 as shown in Figure 6. Formed in the top of table 91 are a plurality of elongated slots 95 (Figures 1 and 3) disposed at right angles to the shoulders 94, the table being further provided with a pair of pan guides 96 parallel to the slots 95, and with tapered pan engaging stops 97 adapted to engage the outer pans of the series of pans being constantly urged into filling position.

The table 91 is arranged to receive three parallel longitudinal rows of pans, one row for each measuring shell 28 and the pans in the longitudinal rows are disposed in transverse alinement, each transversely alined row of pans being supported on one of seats 93, and slots 95 are arranged in the table 91 in such manner that they are disposed centrally of the longitudinal rows of pans, all of which is clearly shown in Figures 1, 4 and 6.

Supported from the end of the table 91 is a pan feeding support or extension 98 provided with a vertically extending projecting portion 99. Mounted directly beneath table 91 for reciprocating motion is a frame 101 (Figures 4 and 6) provided with longitudinally extending bars 102, adjacent to and parallel with slots 95. Pivotally secured to each of the bars 102 is a plurality of gravity actuated pawls 103, the upper ends of which are adapted to ride in the slots 95 upon reciprocation of the frame 101, the pawls carried by bars 102 being in transverse alinement, there being preferably three transversely extending series of pawls adapted to act upon the three rear most transverse series of pans to move the pans forward upon reciprocation of the frame 101, the foremost transverse series of pans being urged forward by contact therewith of the adjacent series of pawl actuated pans.

Bars 102 as shown in Figure 6 are provided with stop pins 104 to allow pawls 103 to swing on their pivots upon rearward movement of the frame 101 and to be engaged by the pawls upon forward movement of the frame 101 to move the pans forward successively into filling position, shoulders 94 preventing rearward movement of the pans by engagement of pawls 103 therewith upon rearward movement of the frame 101.

Secured to shaft 65 is the hub portion 105 of a cam 106 which as shown in Figures 1 and 7 is provided with parallel flanges 107 defining a roller engaging and actuating channel 108 in which rides a roller 109 carried by the intermediate portion of a frame reciprocating bar 110 which at its lower end is pivoted on a transversely extending shaft 111 whose opposite ends are supported by downward extensions 112 of the side members 11, and which at its upper end is pivotally secured to the frame 101 as indicated at 113.

Thus upon rotation of shaft 65 cam 106 is rotated, roller 109 riding on channel 108 and imparting an oscillating motion to bar 110 which in turn imparts a reciprocating motion to frame 101, and frame 101 through pawls 103 intermittently advances the pans forward into feeding position under the measuring shells 28.

Means are further provided for moving the pans away from the table 91 upon being pushed from the feeding position by the reciprocating frame 101 which means comprises a revoluble table 114 the edge of which revolves closely adjacent the discharge end of the table 91 and is centrally supported by a vertically disposed shaft 115 (Figure 2) which is supported for rotation in suitable bearing members 116 and 117 projecting from the frame 10, the lower bearing member 117 being supported by a bracket 118 supported by a brace member 119 secured to frame 10.

Adjustably secured to the shaft 115 is a gear 121 which meshes with and is driven by a pinion carried by one end of a shaft 122, the other end of which carries a pinion 123, (Figure 1) meshing with a gear 124 carried by shaft 65. Pinion 123 and gear 124 are partially enclosed by a guard 125. As shaft 65 rotates, shaft 122 is rotated through pinion 123 and gear 124 which in turn through the meshing pinion and gear 121 imparts rotation to the shaft 115 causing the table 114 to revolve to carry the filled pans away from the table 91 as indicated in Figure 2.

As is shown is Figure 1 a feed pipe 126 extends from a suitable mixing device in a room above that in which the filling mechanism is located into the hopper 14 and is provided with a slide valve 127 to regulate the introduction of scrapple or other material into the hopper 14.

*Operation*

In operation, scrapple or other material to be filled into the pans is admitted from the mixing room through feed pipe 126 into hopper 14 upon opening of the valve 127, this valve being closed when a sufficient quantity of material has been admitted to the hopper.

A plurality of pans are placed in position as shown in Figure 1 with one transverse series of pans in register with chambers 32 of the measuring shells 28. Belt 59 is driven by any suitable means such as an electric motor which causes rotation of loose pulley 58. When it is desired to set the filling mechanism into operation, clutch lever 57 is actuated throwing cone 56 outwardly to expand shoes 62 within the drum 61 whereupon the rotation of pulley 58 is transmitted to main drive shaft 55 which through the meshing pinion 63 and gear 64 causes rotation of shaft 65, which in turn imparts rotation to cam 106 causing a reciprocating movement of pan feeding frame 101 through the arm 110 carrying the roller 109 moving in the cam channel 108.

Gear wheel 66 carried by the rotating shaft 65 meshes with and imparts rotation to the gear wheed 67 which in turn causes rotation of shaft 68 imparting rotation to cams 76 and reciprocating motion to the rods 53. Rods 53 through cross bar 52 impart a similar reciprocation to rods 36 moving the plungers 35 upward and downward within the chambers 32.

The rotation of shaft 68 further imparts reciprocating motion to rods 47 through cranks 69 and 71 and connecting rods 74. Rods 47 in turn through bar 43 impart reciprocation to rods 34 and consequently pistons 33 within chambers 31.

The rods 34 and 36 reciprocate in such manner that as pistons 35 approach their lowest positions as shown in Figure 5, pistons 33 move upward creating a partial vacuum within the chambers 31 drawing a measured charge of scrapple or other material into chambers 31 through chambers 32 and ports 37, the cut away portions 38 controlling this action.

When chambers 31 have been filled, pistons 35 move upward putting port 37 into communication with the atmosphere through the open lower ends of chambers 32 and closing chambers 32 immediately above ports 37, whereupon pistons 33 move downward forcing the charge of hot scrapple or other materials from chambers 31 through ports 37 and out through the lower ends of chambers 32 into pans previously located beneath the chambers 32 by operation of the feeding cam 106, which is driven at the same speed as cams 76 through meshing gears 66 and 67, which are of equal diameter and cam 106 is so shaped that the frame 101 is given one complete reciprocation upon each pan filling operation of the mechanism, frame 101 through pawls 103 advancing the pans a sufficient distance to dispose a transverse series of empty pans in alinement with chambers 32 and to force a similar series of loaded pans therefrom just prior to the downward stroke of the pistons 33 which force the charges of material into the pans.

Upon rotation of shaft 65 which imparts rotation to cam 106 shaft 122 is rotated through meshing pinion 123 and gear 124 which shaft in turn imparts rotation to the vertical shaft 115 which in turn causes the table 114 to revolve to carry the filled pans that have been pushed on the table by frame 101 into convenient reach of an attendant who picks the filled pans from table 114 and transfers them to a conveyor which carries them to a chilling room. It will be noted that as the empty pans are successively advanced into filling position additional pans must be placed on table 91, and as the filled pans are pushed on table 114 if no empty pan is in position to move into filling position, the filled pans will not be discharged. Table 114 is revolved at such speed that the filled pans will be carried away without any tendency of the pans to become jammed.

It will be seen from the foregoing disclosure that a filling and measuring machine for hot scrapple and similar materials is provided which is comparatively simple in construction, efficient and reliable in operation, and which is well adapted for the purpose for which it is intended.

While I have disclosed but one embodiment of my invention it is to be understood that I am not limited to the details thereof but am at liberty to make such changes or alterations as fairly fall within the scope of the subjoined claims. Accordingly, what I claim and desire to secure by U. S. Letters Patent is:—

1. A machine for filling scrapple into pans comprising a frame; a pan supporting table carried by said frame, a container supported by said frame above said table; a plurality of measuring shells carried by said container terminating in proximity to said table; a frame mounted for reciprocation beneath said table for periodically advancing a plurality of pans to a filling position beneath said measuring shells; a revolvable table supported on a vertically disposed rotatable shaft for carrying the filled pans away from said pan supporting table; a pair of rotatable interconnected shafts supported by said frame; separate means carried by one of said shafts for actuating said reciprocating frame and imparting rotation to said vertically disposed shaft respectively; means carried by the other shaft for discharging measured quantities of material from said measuring shells into said plurality of pans upon being advanced to said filling position and means for imparting rotation to one of said rotatable shafts.

2. In a container filling machine; a container supporting table provided with a plurality of lonigtudinal slots; said table provided with a plurality of stepped portions providing seats for successive containers; said stepped portions providing shoulders disposed transversely to said slots for limiting movement of said containers in one direction; and reciprocating means for engaging said containers through said slots for periodically advancing same upon said stepped portions.

3. The structure set forth in claim 2, in which said reciprocating means comprises a frame mounted for reciprocation beneath said table; bars supported by said frame in substantial alinement with said slots; gravity actuated pawls pivotally supported by said bars; and projecting into said slots, stop pins carried by said bars to limit movement of said pawls upon forward movement of said frame to advance said containers on said table and to permit movement of said pawls upon rearward movement of said frame; and means for imparting reciprocating movement to said frame.

4. In a container filling machine; a container supporting table provided with a plurality of transverse shoulders defining a plurality of successive stepped container seats; said table further provided with a plurality of longitudinal slots; a reciprocating frame supported beneath said table; and means carried by said frame for advancing containers upon successive seats upon movement of said frame in one direction; said shoulders preventing reverse movement of said containers upon movement of said frame in the opposite direction.

5. A machine for filling material into containers; comprising a plurality of measuring shells; each of said measuring shells comprising a suction chamber and a feed chamber; a plunger mounted in each chamber for reciprocation therein for controlling the discharge of material from said measuring shells; a piston supporting rod projecting vertically from each of said suction chambers; a piston supporting rod projecting vertically from each of said feed chambers; a transverse bar connecting the upper ends of said first rods; a second transverse bar connecting the upper ends of said second rods; and means for imparting vertical reciprocating movement to said transverse bars, said means comprising a rotatable drive shaft, a pitman connected between said shaft and said first transverse bar, and mechanism including a cam connected between said shaft and said second transverse bar.

6. A machine for filling material into containers, comprising a plurality of measuring shells; each of said measuring shells comprising a suction chamber and a feed chamber; a plunger mounted in each chamber for reciprocation therein for controlling the discharge of material from said measuring shells; a piston supporting rod projecting vertically from each of said suction chambers; a piston supporting rod projecting vertically from each of said feed chambers; a transverse bar connecting the upper ends of said first rods; a second transverse bar connecting the upper ends of said second rods; and means for imparting vertical reciprocating movement to said transverse bars, said means comprising a pair of vertical rods engaging the opposite ends of said first transverse bar; a pair of vertical rods engaging the opposite ends of said second transverse bar; a rotatable shaft; pitmen carried by the opposite ends of said shaft and connected to said first vertical rods for imparting reciprocating motion thereto upon rotation of said shaft; and cams carried by said shaft and engaged with said second vertical rods for imparting reciprocating motion thereto upon rotation of said shaft.

7. A filling machine comprising a feed hopper; a plurality of measuring chambers; a valve chamber for each measuring chamber disposed so as to open into said hopper into the associated measuring chamber, and into a container disposed therebeneath; a valve in each valve chamber; a plunger in each measuring chamber; mechanism to positively control the movement of said valves and plungers in timed relation; reciprocating means for periodically advancing a plurality of containers to a position beneath said valve chambers; rotatable means to convey said containers away from said position; and mechanism for simultaneously operating said container advancing and rotatable conveying means in timed relation to said valves and plungers.

In testimony whereof I affix my signature.
CHARLES H. VOGT.